(12) United States Patent
Hunter et al.

(10) Patent No.: US 8,549,210 B2
(45) Date of Patent: *Oct. 1, 2013

(54) MIRRORING VIRTUAL MACHINES FROM A PRIMARY HOST TO A SECONDARY HOST

(75) Inventors: Graham Hunter, Manchester (GB); James Mulcahy, Manchester (GB)

(73) Assignee: International Business Machines Corporation, Armonk, NY (US)

(*) Notice: Subject to any disclaimer, the term of this patent is extended or adjusted under 35 U.S.C. 154(b) by 72 days.

This patent is subject to a terminal disclaimer.

(21) Appl. No.: 13/236,842

(22) Filed: Sep. 20, 2011

(65) Prior Publication Data

US 2013/0073778 A1   Mar. 21, 2013

(51) Int. Cl.
   *G06F 12/08*   (2006.01)
(52) U.S. Cl.
   USPC ........................................ 711/6; 711/E12.016
(58) Field of Classification Search
   USPC ................... 711/6, 154, 162, 170, E12.016
   See application file for complete search history.

(56) References Cited

U.S. PATENT DOCUMENTS

| | | | |
|---|---|---|---|
| 7,962,703 | B1 | 6/2011 | Shah et al. |
| 2007/0101098 | A1 | 5/2007 | Shin et al. |
| 2009/0063751 | A1 | 3/2009 | Dow |
| 2010/0077128 | A1 | 3/2010 | Stansell et al. |
| 2011/0167195 | A1 | 7/2011 | Scales et al. |

FOREIGN PATENT DOCUMENTS

WO   2010056748 A1   5/2010

OTHER PUBLICATIONS

Cully et al.; Remus: High Availability via Asynchronous Virtual Machine Replication; pp. 161-174 of 5th USENIX Symposium on Networked Systems Design and Implementations (NSDI); Aug. 2008.*
Youhui, et al, "A Checkpoint-based High Availability Run-time System for Windows NT Clusters," IACM SIGOPS Operating Systems Review, Apr. 2002, vol. 36 Issue 2, ACM New York, NY, USA.
Cully, Brendan, "High-Speed Checkpointing for High Availability," Xen Summit 5, Nov. 2007, http://www.xen.org/files/xensummit_fall07/26_BrendenCully.pdf.
Wheeler, Eric, Virtual Machine Checkpointing in High-Availability Environments, http://Www.Evancarmichael.Com/Technology/2839/Virtual-Machine-Checkpointing-In-Highavailability-Environments.html.
GB Intellectual Property Office; Great Britain patent application GB1215980.2; Search Report dated Dec. 24, 2012 (4 pp.).

* cited by examiner

*Primary Examiner* — Mardochee Chery
(74) *Attorney, Agent, or Firm* — Yudell Isidore Ng Russell PLLC

(57) ABSTRACT

A system and computer program product for mirroring virtual machines from a primary host to a secondary host. The system includes a processor tracking changes for each of a plurality of memory pages and processor states for one or more primary host virtual machines. Responsive to an occurrence of a checkpoint, the primary host virtual machines are stopped. A determination is made if each of the memory pages is frequently changed. In response to the memory page being frequently changed, the frequently changed memory page is marked as being writeable and copied to a buffer. In response to the memory page being infrequently changed, the infrequently changed memory page is marked as being read only. The one or more primary host virtual machines are resumed. A copy of the memory pages, the buffer and changes to the processor states are transmitted to the secondary host.

9 Claims, 5 Drawing Sheets

MIRRORING VIRTUAL MACHINES FROM A PRIMARY HOST TO A SECONDARY HOST

BACKGROUND

1. Technical Field

The present invention generally relates to computer systems. More specifically, the present invention relates to mirroring virtual machines from a primary host to a secondary host.

2. Description of the Related Art

Computer systems for high availability and reliability applications use backup computers to allow continuous operation with no loss of service in the event of a hardware failure. Data and applications are periodically copied from a primary computer to one or more backup computers. This copying process can also be called mirroring of the contents of the primary computer onto the backup computer. In a virtual machine environment, one or more virtual machines can be in operation on each computer under the control of a virtual machine manager or hypervisor. Each of the virtual machines may require backup.

BRIEF SUMMARY

Disclosed are a system and a computer program product for mirroring virtual machines from a primary host to a secondary host.

The system includes a processor tracking changes for each of a plurality of memory pages for one or more primary host virtual machines and tracking changes to a plurality of processor states for one or more primary host virtual machines. Responsive to an occurrence of a checkpoint, the primary host virtual machines are stopped. A determination is made if each of the particular memory pages is frequently changed. In response to the particular memory page being frequently changed, the frequently changed memory page is marked as being writeable and copied to a buffer in the primary host. In response to the particular memory page being infrequently changed, the infrequently changed memory page is marked as being read only. The one or more primary host virtual machines are resumed. A copy of the memory pages, the buffer and changes to the processor states are transmitted to the secondary host. By marking the frequently changed memory pages as writable and copying the frequently changed memory pages to a buffer in the primary host, the occurrence of memory page protection faults is reduced.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, system and computer program product for mirroring virtual machines from a primary host to a secondary host. Changes to memory pages for one or more primary host virtual machines and processor states are tracked. If a checkpoint occurs, the primary host virtual machines are stopped. For each of the memory pages, it is determined if the memory pages are frequently changed. If the memory pages are frequently changed, the frequently changed memory pages are marked as writeable and copied to a buffer in the primary host. If the memory pages are infrequently changed, the infrequently changed memory pages are marked as read only. The primary host virtual machines are resumed. The infrequently changed memory pages along with the processor states, and the buffer with the frequently changed memory pages are background copied to the secondary host. By marking the frequently changed memory pages as writable and copying the frequently changed memory pages to a buffer, the occurrence of memory page protection faults is reduced.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
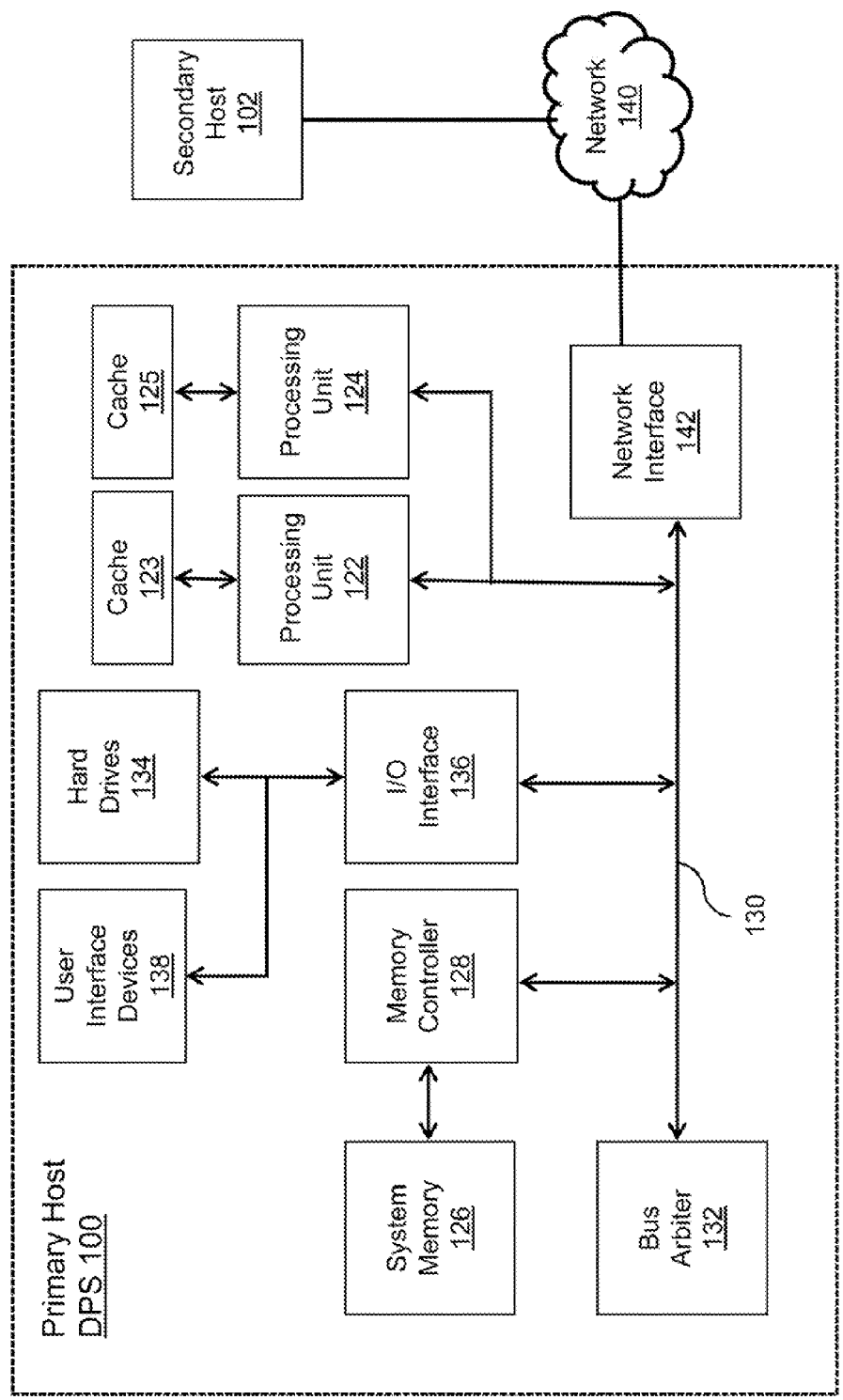
FIG. 1 provides a block diagram representation of an example data processing system within which one or more of the described embodiments are practiced.

With reference now to the figures, and beginning with FIG. 1, there is depicted a block diagram representation of an example data processing system (DPS), as utilized within one embodiment. The data processing system is described as having features common to a server computer. However, as used herein, the term "data processing system," is intended to include any type of computing device or machine that is capable of receiving, storing and running a software product including not only computer systems, but also devices such as communication devices (e.g., routers, switches, pagers, telephones, electronic books, electronic magazines and newspapers, etc.) and personal and home consumer devices (e.g., handheld computers, Web-enabled televisions, home automation systems, multimedia viewing systems, etc.).

FIG. 1 and the following discussion are intended to provide a brief, general description of an exemplary data processing system adapted to implement the described embodiments. While embodiments will be described in the general context of instructions residing on hardware within a server computer, those skilled in the art will recognize that embodiments may be implemented in a combination of program modules running in an operating system. Generally, program modules include routines, programs, components, and data structures, which perform particular tasks or implement particular abstract data types. The invention may also be practiced in distributed computing environments where tasks are performed by remote processing devices that are linked through a communications network. In a distributed computing environment, program modules may be located in both local and remote memory storage devices.

A primary host such as DPS 100 can include one or more processing units 122 and 124, a system memory 126 coupled to a memory controller 128, and a system interconnect fabric 130 that couples memory controller 128 to processing unit(s) 122 and 124 and other components of primary host DPS 100. Interconnect fabric 130 in an embodiment can be an address and data bus. Commands on system interconnect fabric 130 are communicated to various system components under the control of bus arbiter 132.

Primary host DPS 100 can further include cache memory 123 and 125 for high speed storage of frequently used data. Cache memory 123 can be connected to or communicatively coupled with processor 122. While cache memory 123 and 125 are shown operatively connected to processors 122 and 124, cache memory 123 and 125 can also operatively be a part of system memory 126.

Primary host DPS 100 further includes computer readable storage media, such as one or more hard disk drives 134 and one or more user interface devices 138. Disk drives 134 and user interface devices 138 can be communicatively coupled to system interconnect fabric 130 by an input-output (I/O) interface 136. Disk drives 134 provide nonvolatile storage for primary host DPS 100. User interface devices 138 allow a user to provide input and receive output from primary host DPS 100. For example, user interface devices 138 can include displays, keyboards and pointing devices such as a mouse. Although the description of computer readable storage media above refers to a hard disk, it should be appreciated by those skilled in the art that other types of media which are readable by a computer, such as removable magnetic disks, CD-ROM disks, magnetic cassettes, flash memory cards, digital video disks, Bernoulli cartridges, and other later-developed hardware, may also be used in the exemplary computer operating environment.

Primary host DPS 100 may operate in a networked environment using logical connections to one or more remote computers or hosts, such as secondary host 102. Secondary host 102 may be a computer, a server, a router or a peer device and typically includes many or all of the elements described relative to primary host DPS 100. In a networked environment, program modules employed by primary host DPS 100, or portions thereof, may be stored in a remote memory storage device (not shown). The logical connections depicted in FIG. 1 can include connections over a network 140. In an embodiment, network 140 may be a local area network (LAN). In alternative embodiments, network 140 may include a wide area network (WAN). Primary host DPS 100 is connected to network 140 through an input/output interface, such as a network interface 142. It will be appreciated that the network connections shown are exemplary and other means of establishing a communications link between the computers may be used.

Figure 2:
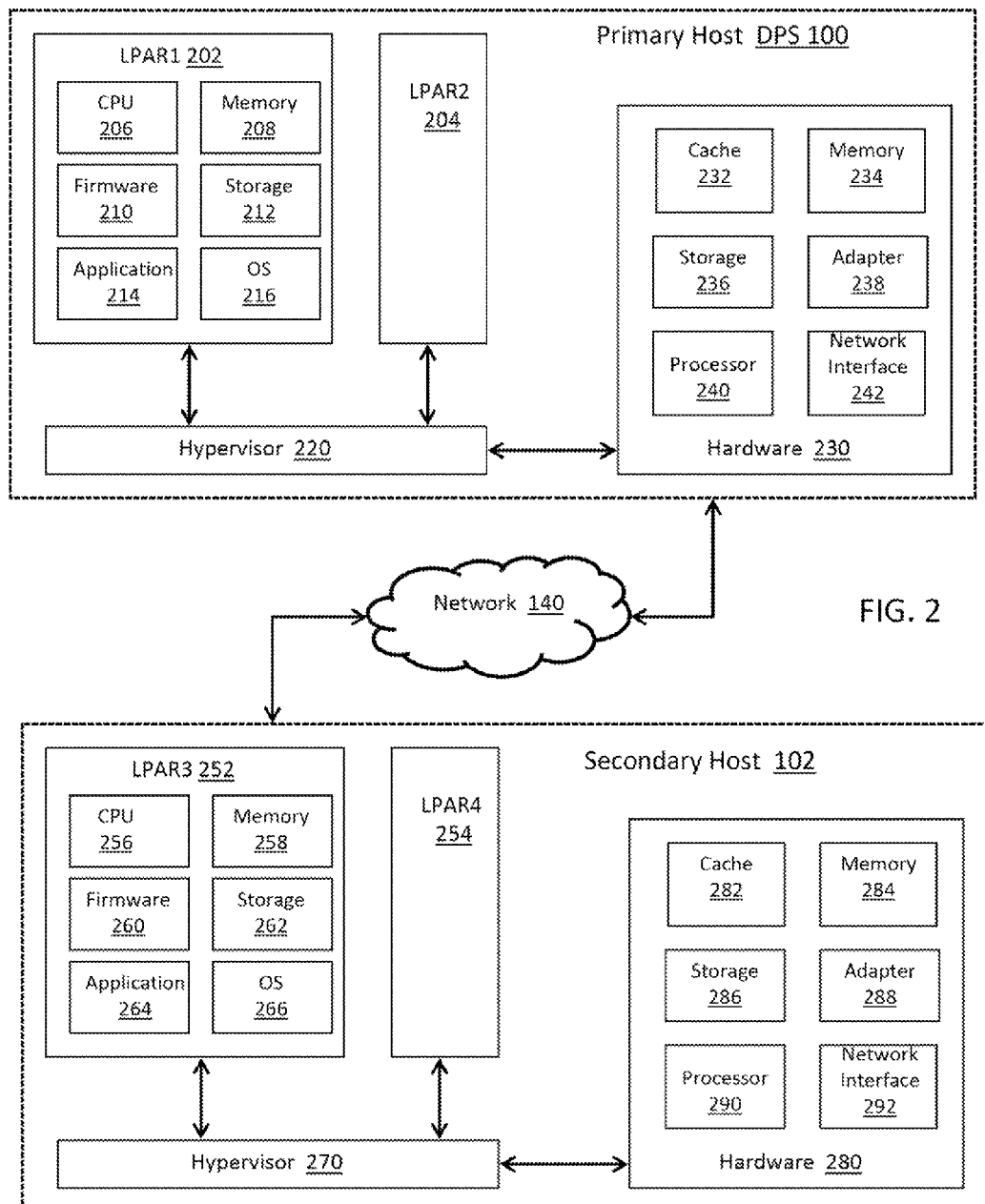
FIG. 2 illustrates a block diagram representation of virtual machines operating on primary and secondary host data processing systems according to one embodiment.

FIG. 2 illustrates multiple virtual machines operating on a primary and a secondary host data processing system in a logically partitioned system according to an embodiment. Primary host DPS 100 includes several virtual machines or logical partitions (LPAR) such as LPAR1 202 and LPAR2 204. While two virtual machines or logical partitions are illustrated, many additional virtual machines or logical partitions can be used in DPS 100. Each of logical partitions LPAR1 202 and LPAR2 204 comprises a division of the computing capabilities or resources of primary host DPS 100.

Each LPAR such as example LPAR1 202, comprises a virtual central processing unit (CPU) or processor 206, virtual memory 208, virtual firmware 210 and virtual storage 212. LPAR1 202 further includes functional modules or software modules such as virtual operating system (OS) 216 and application software 214. Application software 214 is executed by processor 206 within logical partition LPAR1 202. LPAR1 202 and LPAR2 204 operate under the control of hypervisor 220. Each LPAR can communicate with hypervisor 220 and with each other through hypervisor 220. Hypervisor 220 manages interaction between and allocates resources to logical partitions LPAR1 202 and LPAR2 204 including processor resources such as virtual processor 206. Hypervisor 220 controls the operation of LPAR1 202 and LPAR2 204, allowing multiple operating systems to run, unmodified, at the same time on primary host DPS 100, and provides a measure of robustness and stability to the system. Each operating system within the hypervisor operates independently of the others, such that if one operating system experiences a failure, the other operating systems can continue working without interruption.

Primary host DPS 100 further includes hardware 230 upon which logical partitions LPAR1 202 and LPAR2 204 are implemented. Hardware 230 comprises one or more processing units or processors 240, cache memory 232, one or more memories 234, one or more storage devices 236 such as a hard drive, one or more input output adapters 238 and one or more network interfaces 242. Hypervisor 220 is in communication with hardware 230. Hypervisor 220 allows multiple operating systems and applications to share a single hardware host. Hypervisor 220 controls the operation of hardware 230 including processor 240 and other system resources allocating resources to each logical partition.

Similarly, secondary host 102 can include several virtual machines or logical partitions (LPAR) such as LPAR3 252 and LPAR4 254. While two logical partitions are illustrated, many additional logical partitions can be used in secondary host 102. Each of logical partitions LPAR3 252 and LPAR4 254 is a division of resources of secondary host 102.

Each LPAR such as LPAR3 252 comprises a virtual processor 256, virtual memory 258, virtual firmware 260 and virtual storage 262. LPAR3 252 further includes functional modules or software modules such as virtual operating system (OS) 266 and application software 264. Application software 264 is executed within logical partition LPAR3 252. LPAR3 252 and LPAR4 254 operate under the control of hypervisor 270. Each LPAR can communicate with each other and with hypervisor 270. Hypervisor 270 manages interaction between and allocates resources between logical partitions LPAR3 252 and LPAR4 254 and virtual processors such as virtual processor 256. Hypervisor 270 controls the operation of LPAR3 252 and LPAR4 254 and allows multiple operating systems to run, unmodified, at the same time on secondary 102 and provides a measure of robustness and stability to the system. Each operating system within the hypervisor operates independently of the others, such that if one operating system experiences a failure, the other operating systems can continue working without interruption.

Secondary host 102 further includes hardware 280 upon which logical partitions LPAR3 252 and LPAR4 254 are implemented. Hardware 280 has a processing unit or processor 290, cache memory 282, memory 284, storage 286 such as a hard drive, an input output adapter 288 and a network interface 292. Hypervisor 270 is in communication with hardware 280. Hypervisor 270 allows multiple operating systems and applications to share a single hardware host. Hypervisor 270 controls the operation of hardware 280 including processor 290 and other system resources allocating resources to each logical partition. Network 140 provides communications between primary host DPS 100 and secondary host 102. Network 140 allows hypervisors 220 and 270 to communicate with each other and to transfer data and operating parameters from primary host DPS 100 to secondary host 102.

Those of ordinary skill in the art will appreciate that the hardware components and basic configuration depicted in FIG. 1 and FIG. 2 may vary. The illustrative components within primary host DPS 100 and secondary host 102 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 and FIG. 2 may be, for example, an IBM eServer pSeries system, a product of International Business Machines Corporation in Armonk, N.Y., running the Advanced Interactive Executive (AIX) operating system (Trademark of IBM Corporation) or LINUX operating system (Trademark of Linus Torvalds).

Figure 3:
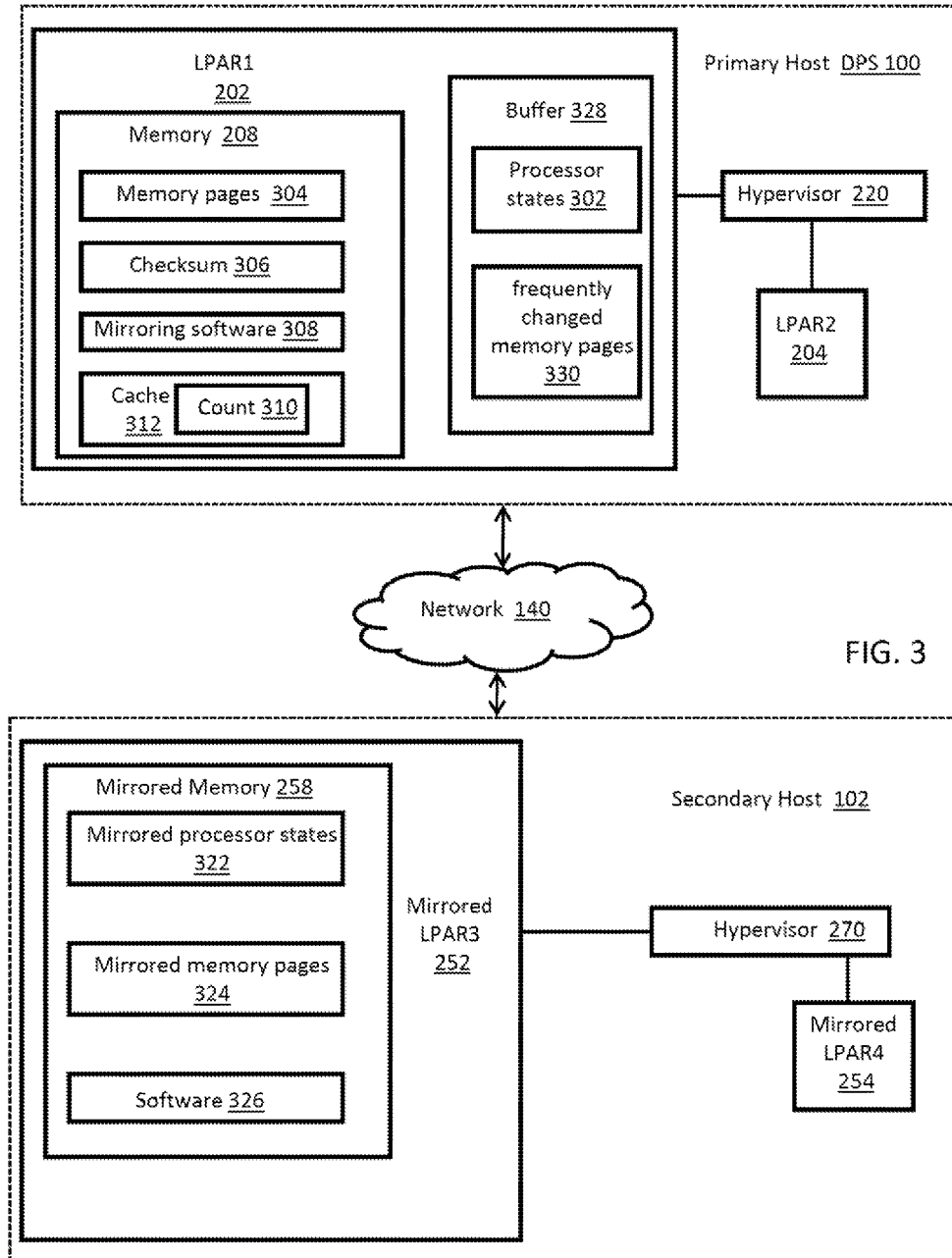
FIG. 3 is a block diagram illustration of the functional modules and components used in mirroring virtual machines according to one embodiment.

FIG. 3 illustrates functional modules and components used in mirroring or copying primary host DPS 100 to secondary host 102. In the discussion of FIG. 3, reference is also made to elements described in FIG. 1 and FIG. 2. Primary host DPS 100 includes hypervisor 220 that controls, manages interactions between, and allocates resources of several virtual machines or logical partitions, e.g., LPAR1 202 and LPAR2 204. Hypervisor 220 is in communication with and controls the operation of virtual memory 208, virtual cache memory 312 and buffer 328. Virtual memory 208 stores data and software programs that are executed on virtual processor 206. Virtual memory 208 stores memory pages 304, checksum 306 and mirroring software 308. Virtual memory 208 can further include a cache memory 312 that stores a count 310 of the frequency or number of times that a memory page is changed or written to. Count 310 is generated or maintained for each memory page. As utilized within this context, buffer 328 can be a separate memory location that is under the control of hypervisor 220. Frequently changed memory pages 330 (also referred to as buffered-for-sending memory pages) and processor states 302 are stored in buffer 328.

Secondary host 102 includes hypervisor 270 that controls, manages interaction between and allocates resources of several mirrored or copied logical partitions, e.g., mirrored LPAR3 252 and mirrored LPAR4 254. Hypervisor 270 is in communication with and controls the operation of mirrored virtual memory 258. Mirrored virtual memory 258 stores a copy of the data and software programs from virtual memory 208. The data and software programs of mirrored virtual memory 258 are executed on virtual processor 256. Mirrored virtual memory 258 stores mirrored processor states 322, mirrored memory pages 324 and mirroring software 326.

Network 140 provides communications between primary host DPS 100 and secondary host 102. Network 140 allows hypervisors 220 and 270 to communicate with each other and to transfer memory pages and processor states.

In an embodiment, primary host DPS 100 may periodically copy or mirror one or more of the virtual machines LPAR1 202 and LPAR2 204 including the contents of memory pages 304 and processor states 302 to secondary host 102. For example, primary host DPS 100 may copy or mirror the contents of virtual memory 208 to secondary host 102 at a checkpoint that occurs every n milliseconds, where n is any selected design parameter such as 25 milliseconds. Virtual machines LPAR3 252 and LPAR4 254 are copies or replicas of LPAR1 202 and LPAR2 204, respectively. Mirrored virtual machines LPAR3 252 and LPAR4 254 are provided with the exact same hardware and operating system resources as virtual machines LPAR1 202 and LPAR2 204, Mirrored memory 258 allows secondary host 102 to continue normal computing operations with no loss of service should the primary host DPS 100 suffer a failure of hardware 230 or of any virtual machines LPAR1 202 and LPAR2 204. If the hypervisor 270 of secondary host 102 detects that primary host DPS 100 is not responding, or receives an explicit failure notification from primary host DPS 100, hypervisor 270 of secondary host 102 starts the mirrored version of virtual machines, mirrored LPAR3 252 and mirrored LPAR4 254. The mirrored version of virtual machines, mirrored LPAR3 252 and mirrored LPAR4 254, then resume/continue normal computing operations after a failure in the primary host DPS 100.

One of the performance bottlenecks or limits in the process of mirroring the primary host DPS 100 to the secondary host 102 is the rate at which pages of modified memory are transferred from the primary host DPS 100 to the secondary host 102 during execution. The memory used by LPAR1 202 can be marked as read only following every checkpoint. A memory page protection fault can occur when LPAR1 202 attempts to access a read only protected memory page 304.

The virtual machine running on a primary computer can be stopped on a recurring periodic basis and the contents of the virtual machine sent to the backup computer. Recognizing that periodically copying or mirroring the contents of the primary computer onto the backup computer can cause a performance slowdown or bottleneck, the described embodiments substantially increase the efficiency of system resources during the copying and transfer operations.

Figure 4A:
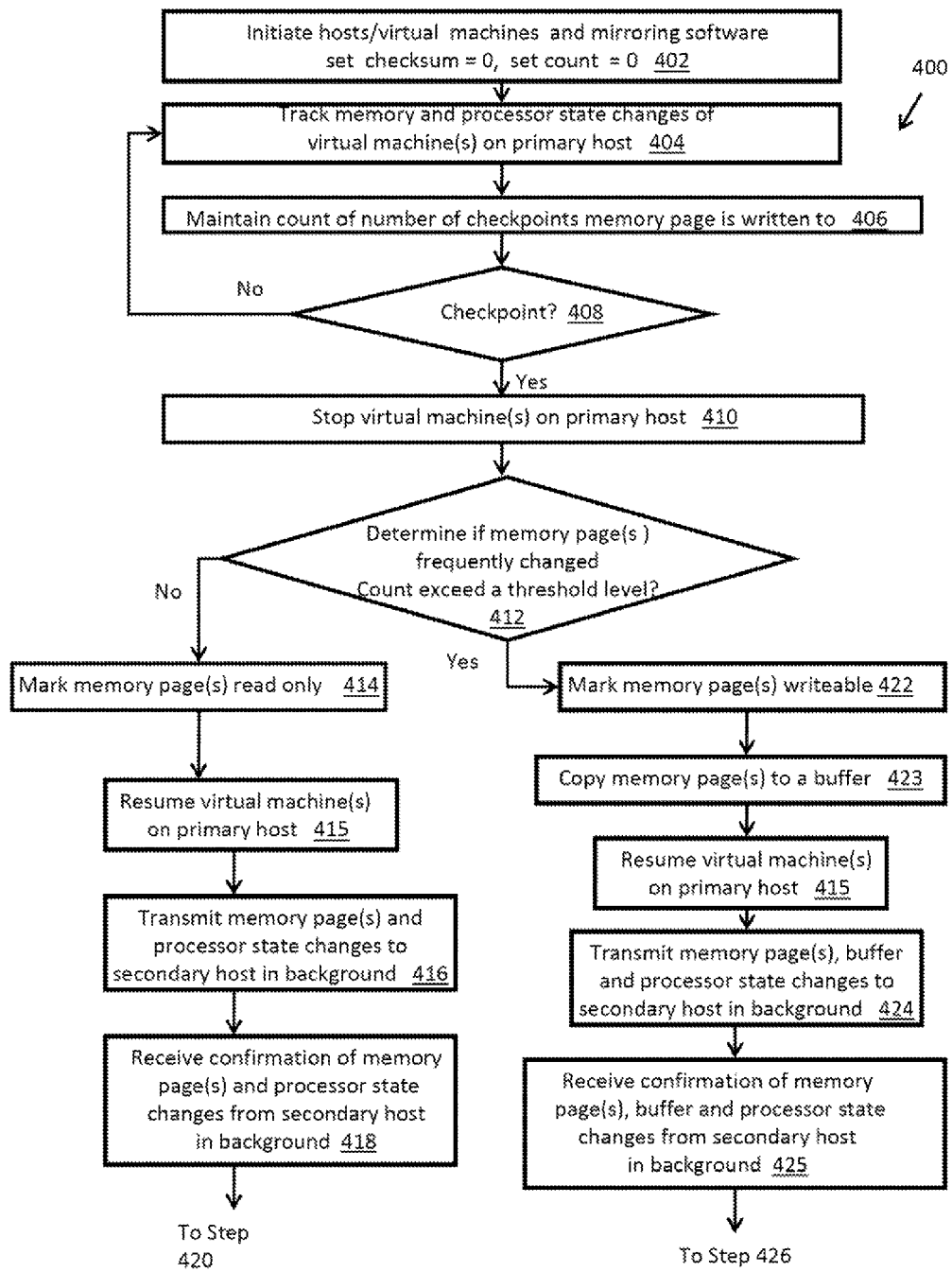
FIGS. 4(A&B) provides a flowchart illustrating the processes for mirroring virtual machines from a primary host to a secondary host according to one embodiment.
Figure 4B:
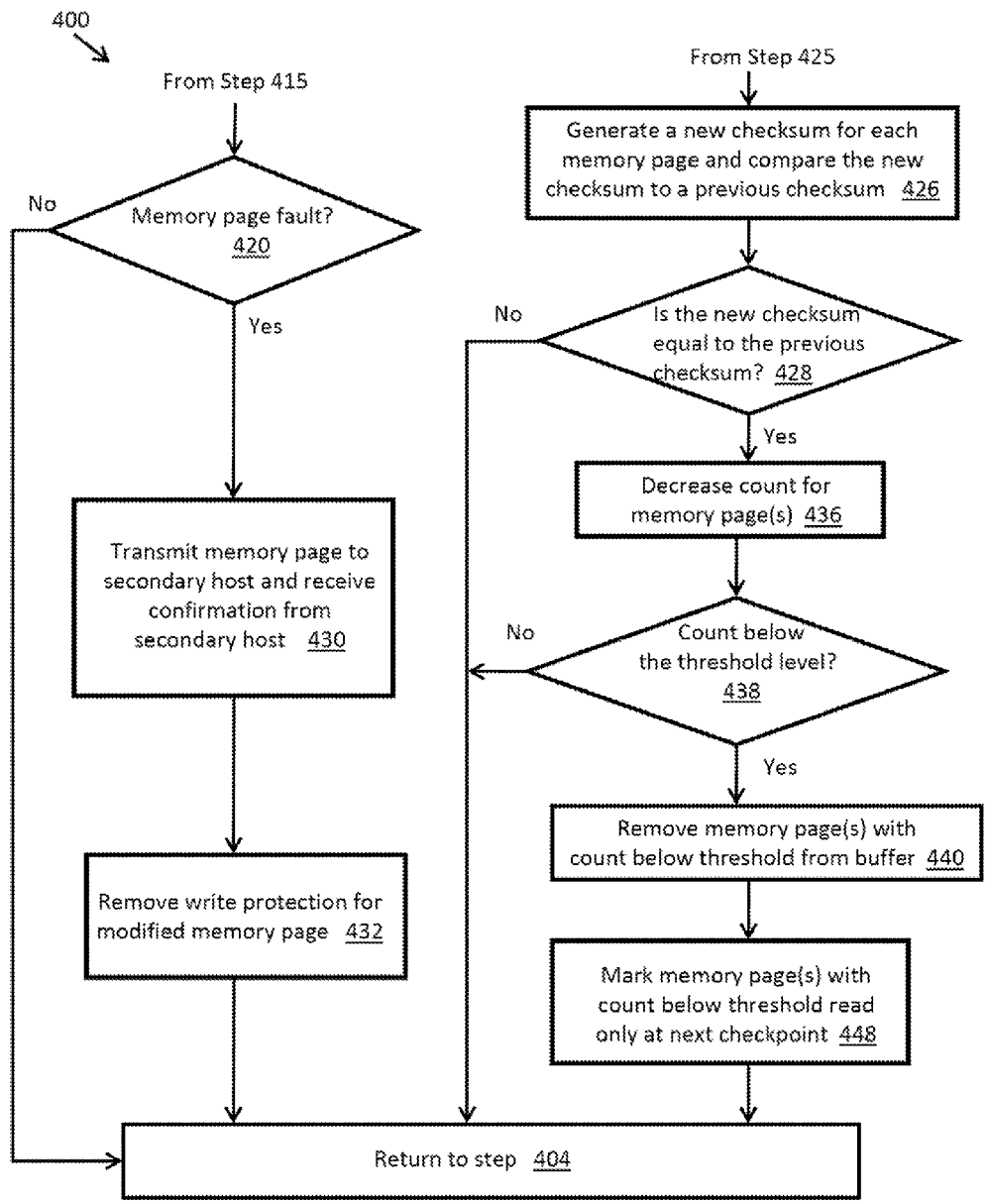

FIGS. 4A and 4B illustrate a flowchart of an exemplary process for reducing memory page faults in a virtual machine according to an illustrative embodiment. In the discussion of FIGS. 4A and 4B, reference is also made to elements described in FIG. 1, FIG. 2 and FIG. 3. Computer implemented method 400 can be implemented in primary host DPS 100 in conjunction with secondary host 102 and network 140. In an embodiment, computer implemented method 400 can increase the performance of a primary host computer, such as DPS 100, that is periodically copying or mirroring its contents onto one or more redundant secondary host computers such as secondary host 102 at a series of recurring checkpoints.

Hypervisor 220 initiates or starts the operation of primary host DPS 100 including initiating mirroring software 308, setting the checksum 306 equal to zero and setting the count 310 equal to zero (402). At the same time, hypervisor 270 initiates or starts the operation of secondary host 102 including initiating software 326 (402).

Hypervisor 220 tracks changes to the memory and processor states running on primary host DPS 100 (404). This can include changes to CPU 206 and memory 208 in logical partition LPAR1 202 and any changes to any additional logical partitions such as LPAR2 204.

Hypervisor 220 maintains or generates a count of the number of successive checkpoints windows that a memory page has been written to (406). The count measures the number of successive checkpoint windows (i.e., the period of time between successive checkpoints) during which an individual memory page is written to or dirtied during processing. The count is maintained for each memory page. The count can be stored in cache 312 for fast access. The count is hashed to part of the memory addresses in cache 312. Hashing uses a hash function or mathematical function to convert a large possibly variable sized amount of data into a small datum, usually a single integer that may serve as an index to an array. The small datum is appended to the memory address.

Hypervisor 220 checks to see if a checkpoint has occurred (408). As utilized herein, a checkpoint is a periodically recurring point at which the primary host virtual machines are mirrored onto the secondary host virtual machines. In an embodiment, the checkpoint can occur every 25 milliseconds. The count can begin or occur continuously at each checkpoint over a series of sequential checkpoints.

The changes that are tracked (404) can be changes to memory pages and processor states that occur between sequential checkpoints. A page or memory page is defined as a fixed-length contiguous block of real or virtual memory that is the smallest unit of data for a memory allocation performed by the operating system for a program or for a transfer between system memory or cache and any other device such as a secondary host. A memory page can be allocated in portions or sizes of 4K or in other sizes. A processor state refers to the operating condition of the processor. For example, a processor can be in an operating state, a halt state or a sleep state.

If a checkpoint has occurred, hypervisor 220 stops the virtual machine(s) running on primary host DPS 100 (410). If a checkpoint has not occurred, method 400 returns to step 404.

Hypervisor 220 determines for each memory page if the memory page is frequently changed or written to (412). Hypervisor 220 performs step 412 by checking to see if the count has increased above or exceeded a threshold level for each memory page. In an embodiment, the threshold level may be pre-determined. In another embodiment, the threshold level may change or be varied depending upon system workload and performance factors.

If the count does not exceed the threshold level in step 412, hypervisor 220 marks the memory page(s) that are below the threshold level as read only (414). Hypervisor 220 then resumes the operation of the virtual machine(s) running on primary host DPS 100 (415). Hypervisor 220 captures the memory page changes and processor state changes of primary host DPS 100 and transmits a copy of the memory page changes and processor state changes over network 140 to secondary host 102 (416). The transfer operation occurs in the background. Hypervisor 270 of secondary host 102 confirms or acknowledges receipt of the memory and processor state changes to hypervisor 220 (418) as a background operation. The operations of steps 416 and 418 occur in the background at the same time as the virtual machine(s) are running on primary host DPS 100.

After the hypervisor 220 resumes operation of virtual machine(s) running on primary host DPS 100 (415), method 400 checks to see if a memory page protection fault has occurred when hypervisor 220 attempts to write to a memory page marked as read only memory in primary host DPS 100 (420). Because the memory page is marked read only, any attempted writing operation to the read only protected memory addresses will incur a memory page protection fault. If a program tries to access a location in such a memory page, an exception called a memory page protection fault is generated. If a memory page protection fault has not occurred in step 420, method 400 returns to step 404 where hypervisor 220 tracks the memory and processor state changes of primary host DPS 100.

If a memory page protection fault has occurred in step 420, Hypervisor 220 transmits the memory page to secondary host 102 and waits to receive confirmation from secondary host 102 that the memory page has completed copying (430). The memory page is transmitted immediately for memory pages that were modified during the previous checkpoint. Memory pages with new changes or modifications are transmitted at the next occurring checkpoint. In an alternative embodiment, step 430 can be replaced by hypervisor 220 copying the memory page to a secondary buffer in hardware memory 234 that is not accessible by the virtual machine(s) LPAR1 202. At step 432, hypervisor 220 removes the write protection or read only status from the memory page so that the memory page does not incur another memory page fault. Method 400 then returns to step 404 where hypervisor 220 tracks the memory changes and processor state changes of primary host DPS 100.

If the count exceeds the threshold level in step 412, method 400 proceeds to step 422 where, for the memory pages that have exceeded the threshold level, hypervisor 220 marks the memory pages as being writeable. These memory pages therefore are able to be written to.

Next, hypervisor 220 copies the memory pages having a count above the threshold level to a buffer (423). The buffer therefore holds memory pages that are frequently used or written to. Coping of the selected memory pages to the buffer occurs while the operation of the virtual machines are stopped or suspended at the checkpoint. Hypervisor 220 then resumes the operation of the virtual machine(s) running on primary host DPS 100 (415). Hypervisor 220 captures the frequently changed memory page(s) and processor state changes of primary host DPS 100 and transmits a copy of the frequently changed memory page(s), the buffer, and processor state changes over network 140 to secondary host 102 (424), as one or more operations that occur in the background. Hypervisor 270 of secondary host 102 confirms or acknowledges receipt of the copy of the memory pages, buffer and processor state changes to hypervisor 220 (425) as a background operation. The operations of steps 424 and 425 occur in the background at the same time as the virtual machine(s) are running on primary host DPS 100 (415). A new checksum is generated and compared to a previous checksum for each memory page that was copied to the buffer (426). A checksum is a fixed size datum computed from a block of digital data for the purpose of detecting errors or changes in the block of data. During initialization (402) the checksum is set to a zero value. The checksum is computed for the memory page using a checksum function or algorithm.

Next, hypervisor 220 checks to see if the new checksum is the same or equal to the previous checksum (428). The new checksums and previous checksums are compared for each memory page that was copied to the buffer. If the new checksum and the previous checksum are equal, hypervisor 220 decreases the count for those memory page(s) with equal checksums (436). If the new checksum and the previous checksum are not equal, hypervisor 220 returns to step 404 where hypervisor 220 tracks the memory and processor state changes of primary host DPS 100. The purpose of generating the checksum is to determine which buffered memory pages are no longer being frequently written to and identify these for removal from the buffer 328.

Hypervisor 220 checks to see if the count has decreased below the threshold level (438). If the count has decreased below the threshold level, where the memory page(s) with a count below the threshold level are removed from the buffer by hypervisor 220 (440). If the count has not decreased below the threshold level in step 438, hypervisor 220 resumes the virtual machine(s) on primary host DPS 100 (434). After step 440, hypervisor 220 marks the memory pages with a count below the threshold level as read only at the next checkpoint (448). Method 400 then returns to step 404 where hypervisor 220 tracks the memory page and processor state changes of primary host DPS 100.

One or more of the described embodiments provide a method of tracking frequently used memory pages that reduce the occurrence of memory page protection faults. The described embodiments reduce the workload on a data processing system. The workload or overhead on the virtual machine caused by interrupting the virtual machine to service memory page faults for frequently used memory pages is substantially reduced or eliminated. The workload or overhead on the hypervisor is reduced because the hypervisor no longer needs to track memory page faults for frequently used memory pages during virtual machine execution. By copying frequently used memory pages to a buffer, data traffic transmitted on the network between the primary host and the secondary host can be transmitted in a more efficient manner.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing system comprising:
   at least one memory having a set of instructions located therein;
   one or more processors in communication with the memory, the processors operable to execute the set of instructions which cause the processor to:
   track changes for each of a plurality of memory pages for one or more primary host virtual machines;
   track changes to a plurality of processor states for one or more primary host virtual machines;
   responsive to an occurrence of a checkpoint, stop one or more of the primary host virtual machines;
   determine for the memory pages, if at least one particular memory page of the plurality of memory pages is a frequently changed memory page;
   in response to at least one particular memory page being a frequently changed memory page, mark the frequently changed memory page as writeable and copy the frequently changed memory page to a buffer;
   in response to a memory page being infrequently changed, mark the infrequently changed memory page as read only;
   resume the one or more primary host virtual machines;
   transmit a copy of the memory pages, the buffer, and the changes to the processor states to a secondary host;
   maintain a count of a number of checkpoint windows that each memory page is written to;
   generate a new checksum for each of the frequently changed memory pages;
   compare the new checksum to a previous checksum for each of the frequently changed memory pages; and
   responsive to the new checksum being equal to the previous checksum, decrease the count associated with each of the frequently changed memory pages.

2. The data processing system of claim 1, further comprising instructions that cause the processor to in response to the count exceeding a threshold level, process the memory pages as frequently changed memory pages, in response to the count being below a threshold level, process the memory pages as infrequently changed memory pages.

3. The data processing system of claim 1, further comprising instructions that cause the processor to responsive to the count decreasing below a threshold level, remove the respective frequently changed memory page from the buffer.

4. The data processing system of claim 1, further comprising instructions that cause the processor to confirm the copy of the memory pages, the buffer and the processor states have been received by the secondary host.

5. A computer program product comprising:
   a non-transitory computer readable storage medium; and program code on the non-transitory computer readable storage medium that when executed within a data processing device, the program code provides the functionality of:

tracking changes for each of a plurality of memory pages for one or more primary host virtual machines;

tracking changes to a plurality of processor states for one or more primary host virtual machines;

responsive to an occurrence of a checkpoint, stopping one or more of the primary host virtual machines;

determining for the memory pages, if at least one particular memory page of the plurality of memory pages is a frequently changed memory page;

in response to at least one particular memory page being a frequently changed memory page, marking the frequently changed memory page as writeable and copying the frequently changed memory page to a buffer;

in response to a memory page being infrequently changed, marking the infrequently changed memory page as read only; resuming the one or more primary host virtual machines;

transmitting a copy of the memory pages, the buffer and the changes to the processor states to a secondary host, and generating a new checksum for each of the frequently changed memory pages; comparing the new checksum to a previous checksum for each of the frequently changed memory pages; and responsive to the new checksum being equal to the previous checksum, decreasing the count associated with each of the frequently changed memory pages.

6. The computer program product of claim 5, further comprising program code on the computer readable storage medium that when executed within the data processing device, the program code provides the functionality of maintaining a count of a number of checkpoint windows that each memory page is written to.

7. The computer program product of claim 6, further comprising program code on the computer readable storage medium that when executed within the data processing device, the program code provides the functionality of in response to the count exceeding a threshold level, processing the memory pages as frequently changed memory pages, in response to the count decreasing below a threshold level, processing the memory pages as infrequently changed memory pages.

8. The computer program product of claim 6, further comprising program code on the computer readable storage medium that when executed within the data processing device, the program code provides the functionality of responsive to the count decreasing below the threshold level, removing the respective frequently changed memory page from the buffer.

9. The computer program product of claim 5, further comprising program code on the computer readable storage medium that when executed within the data processing device, the program code provides the functionality of confirming the copy of the memory pages, the buffer and the processor states have been received by the secondary host.

* * * * *